United States Patent
Yanagihara et al.

(10) Patent No.: US 9,381,584 B2
(45) Date of Patent: Jul. 5, 2016

(54) CORDLESS ELECTRIC POWER TOOL

(75) Inventors: Kenya Yanagihara, Anjo (JP);
 Yoshitaka Ichikawa, Anjo (JP);
 Motohiro Omura, Anjo (JP)

(73) Assignee: MAKITA CORPORATION, Anjo (JP)

( * ) Notice: Subject to any disclaimer, the term of this patent is extended or adjusted under 35 U.S.C. 154(b) by 1155 days.

(21) Appl. No.: 13/308,787

(22) Filed: Dec. 1, 2011

(65) Prior Publication Data

US 2012/0152583 A1 Jun. 21, 2012

(30) Foreign Application Priority Data

Dec. 21, 2010 (JP) ................................. 2010-284143

(51) Int. Cl.
 *B23D 47/12* (2006.01)
 *H02P 6/00* (2016.01)
 *H02H 7/08* (2006.01)

(52) U.S. Cl.
 CPC ............... *B23D 47/12* (2013.01); *H02P 6/002* (2013.01); *H02P 6/005* (2013.01); *H02H 7/08* (2013.01)

(58) Field of Classification Search
 CPC ............. B25F 5/00; H02P 6/08; H02P 6/002; H02P 6/005; H02H 7/08
 USPC .............. 173/217; 388/937; 318/400.01, 599, 318/139, 400.26
 See application file for complete search history.

(56) References Cited

U.S. PATENT DOCUMENTS

| | | | | |
|---|---|---|---|---|
| 5,017,845 A | * | 5/1991 | Carobolante et al. .... | 318/400.11 |
| 5,818,099 A | * | 10/1998 | Burghartz ..................... | 257/548 |
| 6,396,225 B1 | * | 5/2002 | Wakui ..................... | H02P 6/085 |
| | | | | 318/400.01 |
| 6,433,497 B1 | * | 8/2002 | Lee .......................... | H02P 6/001 |
| | | | | 318/319 |
| 6,567,441 B2 | * | 5/2003 | Tsumura et al. ........... | 372/38.02 |
| 6,750,622 B2 | * | 6/2004 | Simizu et al. ................ | 318/139 |
| 6,836,614 B2 | * | 12/2004 | Gilmore ........................ | 388/811 |
| 7,058,291 B2 | * | 6/2006 | Weaver et al. ................ | 318/720 |
| 7,190,131 B2 | * | 3/2007 | Oh .......................... | H02P 6/205 |
| | | | | 318/400.11 |
| 7,276,878 B2 | * | 10/2007 | Phillips et al. ................ | 318/811 |
| 7,697,826 B2 | * | 4/2010 | Reutlinger et al. ........... | 388/800 |
| 7,750,587 B2 | * | 7/2010 | Mueller et al. ................ | 318/461 |
| 7,789,281 B2 | * | 9/2010 | Tanimoto et al. ............. | 227/131 |

(Continued)

FOREIGN PATENT DOCUMENTS

| | | |
|---|---|---|
| JP | A-2000-308268 | 11/2000 |
| JP | A-2003-200363 | 7/2003 |
| JP | B2-4341266 | 10/2009 |

OTHER PUBLICATIONS

Ye, P. D., "Main determinants for III-V metal-oxide-semiconductor field-effect transistors (invited)" (2008).Birck and NCN Publications. Paper 134. http://docs.lib.purdue.edu/nanopub/134.*

(Continued)

*Primary Examiner* — Michelle Lopez
*Assistant Examiner* — Eduardo R Ferrero
(74) *Attorney, Agent, or Firm* — Oliff PLC (57) ABSTRACT

A cordless electric power tool comprises a motor that drives a tool, a battery that supply electric power to the motor and a motor drive circuit that is disposed between the motor and the battery. The motor is a three-phase brushless motor, and the battery has a nominal voltage of 18 volts. An overall electric efficiency of the cordless electric power tool becomes at least 70 percent when a value of current passing through the motor becomes at least 35 amperes but no more than 45 amperes and the cordless electric power tool outputs power of at least 450 watts but no more than 550 watts.

10 Claims, 7 Drawing Sheets

(56) References Cited

U.S. PATENT DOCUMENTS

| | | | |
|---|---|---|---|
| 7,834,566 B2* | 11/2010 | Woods et al. | 318/255 |
| 7,959,050 B2* | 6/2011 | Smith et al. | 227/175.2 |
| 8,513,838 B2* | 8/2013 | Toukairin | B25F 5/008 310/50 |
| 8,760,104 B2* | 6/2014 | Li | 318/599 |
| 9,186,787 B2* | 11/2015 | Noda | B25F 5/00 |
| 2001/0033742 A1* | 10/2001 | Weaver et al. | 388/800 |
| 2003/0062871 A1* | 4/2003 | Antonov et al. | 318/727 |
| 2003/0121685 A1 | 7/2003 | Yamamoto | |
| 2003/0222607 A1* | 12/2003 | Simizu et al. | 318/139 |
| 2006/0039807 A1 | 2/2006 | Hamaoka et al. | |
| 2006/0082339 A1 | 4/2006 | Hamaoka et al. | |
| 2006/0113096 A1 | 6/2006 | Yamamoto | |
| 2007/0080659 A1* | 4/2007 | Urakabe et al. | 318/599 |
| 2007/0250098 A1* | 10/2007 | Malackowski | A61B 17/1613 606/170 |
| 2007/0296375 A1* | 12/2007 | Sakaguchi et al. | 318/811 |
| 2008/0047751 A1* | 2/2008 | Yamate et al. | 175/50 |
| 2009/0015182 A1* | 1/2009 | Kariatsumari et al. | 318/400.02 |
| 2009/0267791 A1* | 10/2009 | Pratt et al. | 340/855.4 |
| 2009/0295313 A1* | 12/2009 | Suzuki et al. | 318/139 |
| 2010/0045215 A1* | 2/2010 | Hawker et al. | 318/139 |
| 2010/0072974 A1* | 3/2010 | Uchida et al. | 323/318 |
| 2010/0079097 A1* | 4/2010 | Woods et al. | 318/494 |
| 2010/0141186 A1* | 6/2010 | Katzenberger et al. | 318/139 |
| 2010/0218966 A1* | 9/2010 | Liebhard et al. | 173/170 |
| 2010/0263895 A1* | 10/2010 | Bosch | 173/217 |
| 2011/0079407 A1* | 4/2011 | Iimura | B25B 23/1405 173/2 |
| 2011/0180286 A1* | 7/2011 | Oomori | B25F 5/008 173/20 |
| 2012/0013280 A1* | 1/2012 | Kern et al. | 318/400.04 |
| 2012/0152583 A1* | 6/2012 | Yanagihara et al. | 173/217 |
| 2012/0312573 A1* | 12/2012 | Yanagihara | B27B 9/00 173/170 |
| 2013/0082627 A1* | 4/2013 | Ichikawa | H02P 6/00 318/139 |
| 2013/0314007 A1* | 11/2013 | Yanagihara | H02P 6/002 318/139 |
| 2014/0203745 A1* | 7/2014 | Omura | H02P 6/002 318/400.26 |

OTHER PUBLICATIONS

Oikawa, T.; Tajima, T.; Masumoto, K.; Akita, H.; Kawaguchi, H.; and Kometani, H., "Development of High Efficiency Brushless DC Motor With New Manufacturing Method of Stator for Compressors" (2002). International Compressor Engineering Conference. Paper 1547. http://docs.lib.purdue.edu/icec/1547.*

* cited by examiner

CORDLESS ELECTRIC POWER TOOL

CROSS-REFERENCE TO RELATED APPLICATIONS

This application claims priority to Japanese Patent Application No. 2010-284143 filed on Dec. 21, 2010, the contents of which are hereby incorporated by reference into the present application.

TECHNICAL FIELD

The present teaching relates to a cordless electric power tool powered by a battery, e.g. a detachable battery pack.

DESCRIPTION OF RELATED ART

JP 2003-200363 A discloses a cordless electric power tool. This cordless electric power tool has a motor that drives a tool, and a battery that supplies electric power to the motor.

SUMMARY OF THE INVENTION

In the cordless electric power tool, a power loss occurs in the battery. This electric power loss is caused by internal impedance of the battery and becomes great according to the amount of current flowing to the battery. Adopting a high-power battery can be considered as a way to prevent the occurrence of the power loss in the battery and to improve output of the electric power tool. The present teaching, however, provides a technology capable of improving output of an electric power tool without increasing output of a battery thereof.

The output of a cordless electric power tool is obtained by deducting a resistive loss of a harness (electrical wiring), loss due to node resistance of a switch, loss due to on-resistance of a motor controller (a motor drive circuit), loss of a motor, and mechanical loss of a deceleration mechanism, from power supplied from a battery to the motor. Focusing particularly on the electrical loss, the present teaching defined an overall electric efficiency η as follows.

Overall electric efficiency η={(tool output+mechanical loss)/(battery voltage×battery current)}× 100%

In the prior art, the output of the electric power tool was improved by increasing the output (e.g., voltage) of the battery. In the present teaching, on the other hand, the output of the electric power tool is increased by improving the overall electric efficiency mentioned above. According to this technique, the output of the electric power tool can be improved without increasing the output of the battery.

Figure 9:
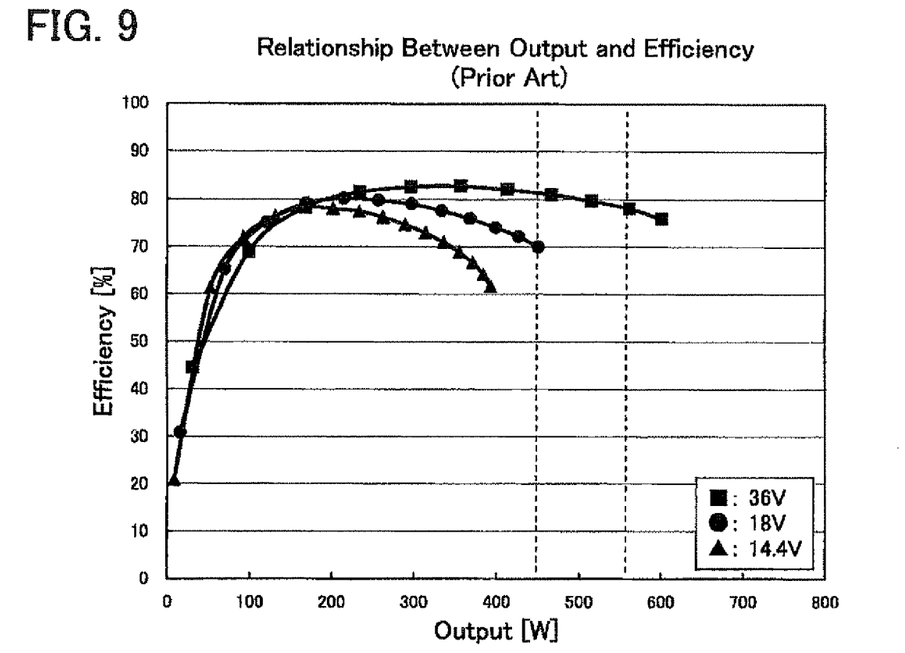
FIG. 9 is a graph showing a relationship between an output and efficiency of the conventional circular saw.
Figure 10:
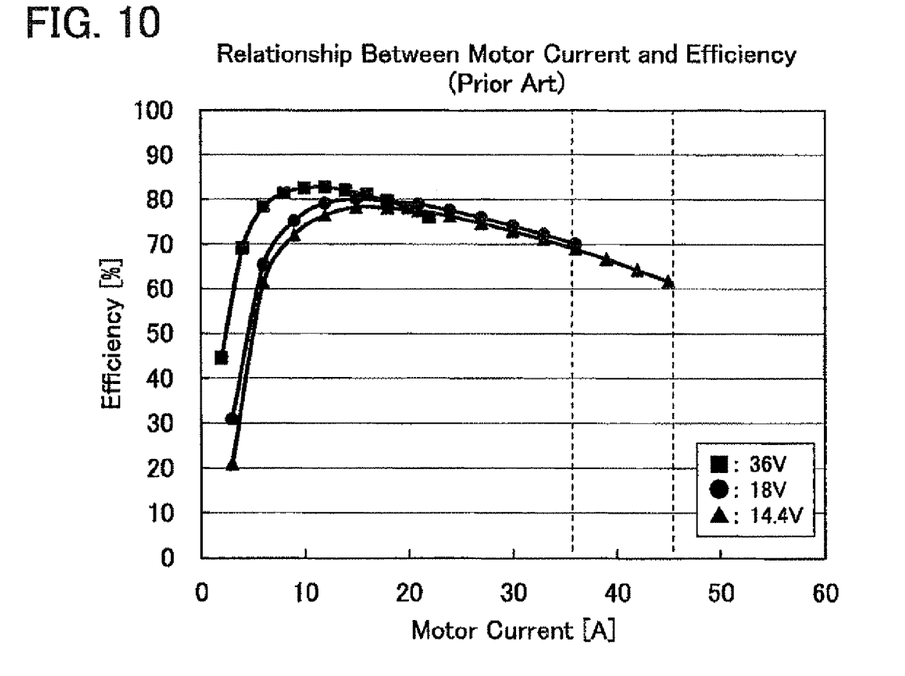
FIG. 10 is a graph showing a relationship between a motor current and efficiency of the conventional circular saw.

Based on the knowledge described above, the present inventor first examined the conventional electric power tool. As a result, the present inventor has discovered that the overall electric efficiency dramatically decreases during a high-output operation of the conventional electric power tool which produces a large current in the motor. In other words, the present inventor has discovered that when the nominal voltage of the battery drops below 36 volts and the conventional electric power tool outputs power of at least 450 watts but no more than 550 watts (the range between the dashed lines), the overall electric efficiency would not reach 70 percent, as shown in FIG. 9. The present inventor has also discovered that, in the conventional electric power tool, when the nominal voltage of the battery exceeds 14.4 volts and a value of current passing through the motor is at least 35 amperes but no more than 45 amperes (the range between the dashed lines), the overall electric efficiency cannot be kept at 70 percent or above, as shown in FIG. 10.

As a result of the examination, the present inventor has discovered that the decrease in the overall electric efficiency during the high-output operation is mainly due to electrical resistances such as winding resistance of the motor, on-resistance of the motor controller, node resistance of the switch, and contact resistance of a harness connector (a solderless terminal, a receptacle, etc.). In other words, the overall electric efficiency can be improved effectively by reducing these electrical resistances.

Based on the knowledge described above, the present inventor has reduced the winding resistance of the motor by increasing the cross-sectional area of a winding strand of winding of the motor and reducing the number of windings. Regarding the on-resistance of the motor controller, the present inventor limited the on-resistance of a switching device thereof (e.g., a MOS-FET) at or below 3 milliohm. In order to eliminate the contact resistance of the harness connector or the node resistance of the switch, the present inventor constructed a circuit in which a semiconductor switch provided inside the motor controller is used for blocking the motor current. Alternatively, when constructing a circuit for blocking the motor current by using a contact switch, the present inventor reduced the contact resistance of the harness connector or the node resistance of the contact switch as much as possible.

As a result, the electric power tool according to the present invention is characterized in having a significantly improved overall electric efficiency and in that the overall electric efficiency becomes at least 70 percent when the electric power tool outputs power of at least 450 watts but no more than 550 watts even when the nominal voltage of the battery of the electric power tool is no more than 24 volts.

The electric power tool of the present teaching is also characterized in that the overall electric efficiency becomes at least 70 percent within a range of large motor currents between 35 amperes and 45 amperes even when the nominal, voltage of the battery is at least 14.4 volts.

According to the present teaching, the output of the electric power tool can be improved without increasing the output of the battery.

DETAILED DESCRIPTION OF INVENTION

An electric power tool according to an embodiment has a motor for driving a tool and a battery for powering the motor. This electric power tool is characterized in that the battery has a nominal voltage of 18 volts and that an overall electric efficiency becomes at least 70 percent when the electric power tool outputs power of at least 450 watts but no more than 550 watts.

Generally, the overall electric efficiency of an electric power tool can be increased in a high output range by increasing the nominal voltage of a battery of the electric power tool. For this reason, the nominal voltage of the battery of the electric power tool described above may be raised to approximately 24 volts. In this case as well, the overall electric efficiency can be kept at 70 percent or above when the electric power tool outputs power of at least 450 watts but no more than 550 watts. In other words, the nominal voltage of the battery is not limited to 18 volts.

The electric power tool of the embodiment is characterized in that the overall electric efficiency becomes at least 70 percent when a value of current passing through the motor becomes at least 35 amperes but no more than 45 amperes.

In a general electric power tool, when the same amount of current flows into the motor thereof, the overall electric efficiency increases as the nominal voltage of the battery of the electric power tool drops. For this reason, the nominal voltage of the battery of the electric power tool described above may be reduced to approximately 14.4 volts. In this case as well, the overall electric efficiency can be kept at 70 percent or above when the value of current flowing through the motor becomes at least 35 amperes but no more than 45 amperes.

In one aspect of the present teaching, the motor for driving the tool can be a three-phase brushless motor. The three-phase brushless motor is connected to the battery via a motor drive circuit that includes a plurality of switching devices. The motor drive circuit here is also referred to as "motor controller." Note that the motor for driving the tool may be not only the three-phase brushless motor but also other type of DC motor.

In one aspect of the present teaching, it is preferred that a cut-off switch including a semiconductor switch is disposed between the motor drive circuit and the battery. In this case, the cut-off switch is preferably turned on/off in response to a switch operation performed by a user. According to this configuration, a contact switch such as a trigger switch can be separated from a motor power supply path to eliminate node resistance of the contact switch from the power supply path.

In one aspect of the present teaching, it is preferred that a pull-up resister be electrically connected to a node of the cut-off switch and the motor drive circuit and be configured to apply a predetermined voltage to the node. According to this configuration, conduction/breaking of the cut-off switch can be examined by turning the cut-off switch on/off while monitoring the voltage applied to the node.

In one aspect of the present teaching, it is preferred that a III-V semiconductor transistor be adopted as one of the switching devices or the motor drive circuit or the cut-off switch. Because the III-V semiconductor transistor has high off-state withstand voltage and low on-resistance, the III-V semiconductor transistor can be adopted favorably in a cordless electric power tool in which large current is supplied to the motor.

EMBODIMENT

Figure 1:
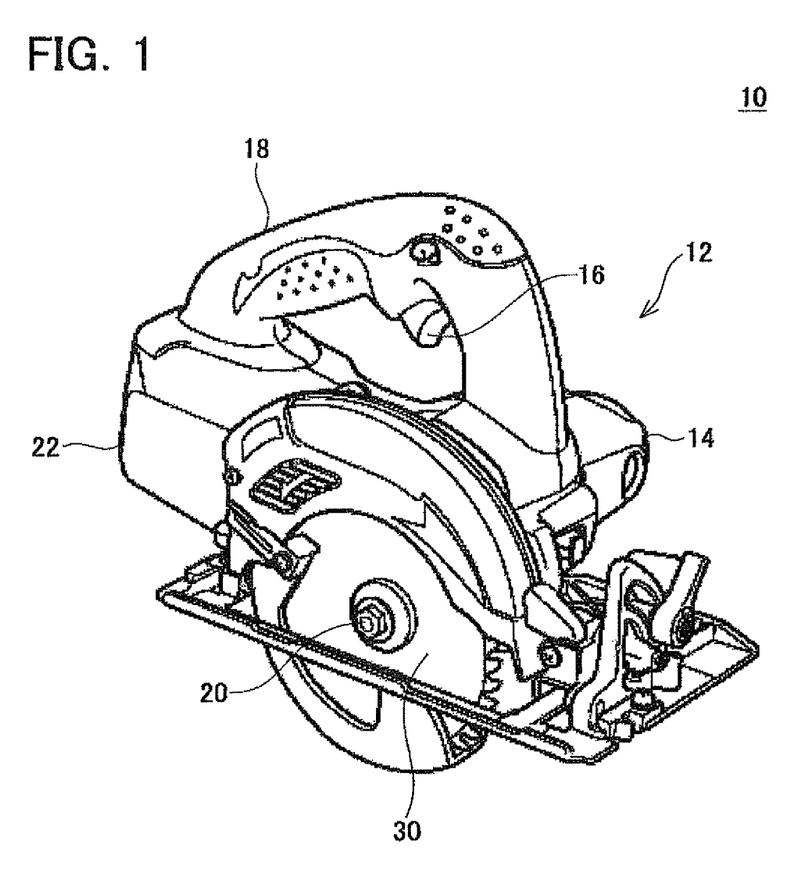
FIG. 1 shows an external view of a circular saw according to an embodiment.

A circular saw 10 according to the embodiment is described hereinafter in detail with reference to the drawings. As shown in FIG. 1, the circular saw 10 has a main body 12, a saw blade 30, and a battery pack 22. The saw blade 30 is an example of the tool having a disc-shaped blade that functions to cut a work piece (a piece of wood). The battery pack 22 is a power source for supplying electric power to the main body 12 and mounted detachable to the main body 12.

The battery pack 22 is a battery pack including a plurality of lithium-ion cells and having a nominal voltage of 18 volts. The battery pack 22 can be of a small type that includes five lithium-ion cells and of a large type that includes ten lithium-ion cells. The circular saw 10 of the present embodiment can use either battery pack. Note that the large battery pack 22 has five pairs of lithium-ion cells connected serially, each pair having two lithium-ion cells connected in parallel.

The main body 12 has a motor 14 for driving the saw blade 30, a trigger switch 16 for activating the motor 14, a grip 18 grabbed by a user, and a tool spindle 20 for holding the saw blade 30. When the user operates the trigger switch 16, electric power is supplied from the battery pack 22 to the motor 14, and consequently the motor 14 is driven to rotate the tool spindle 20 along with the saw blade 30.

Figure 2:
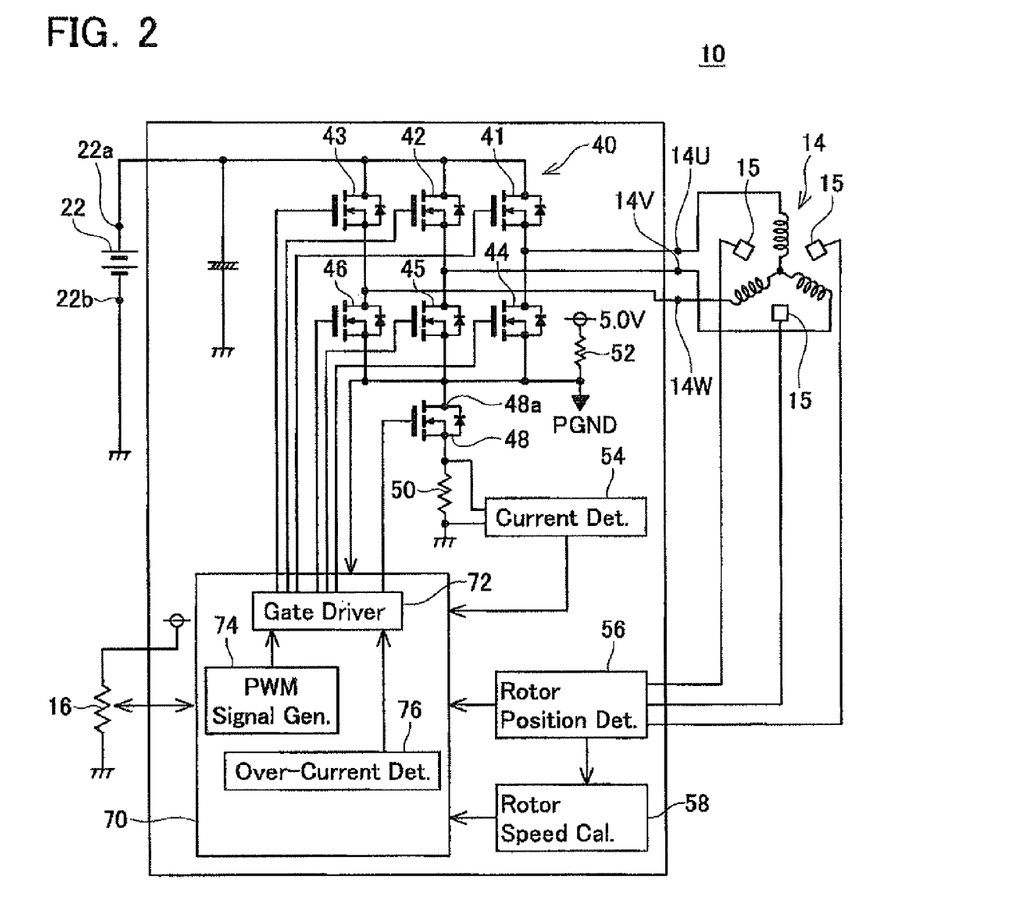
FIG. 2 shows an electrical structure of the circular saw according to the embodiment.

The motor 14 is a three-phase brushless motor. As shown in FIG. 2, the motor 14 has a U-phase terminal 14U, a V-phase terminal 14V, a W-phase terminal 14W, and a position sensor 15 for detecting the position of a rotor.

As shown in FIG. 2, the circular saw 10 has a motor drive circuit 40 and a controller 70 for controlling the motor drive circuit 40. The motor drive circuit 40 is disposed between the battery pack 22 and the motor 14. The motor drive circuit 40 has first to sixth switching devices 41 to 46. The first switching device 41 is disposed between a positive electrode 22a of the battery pack 22 and the U-phase terminal 14U of the motor 14. The second switching device 42 is disposed between the positive electrode 22a of the battery pack 22 and the V-phase terminal 14V of the motor 14. The third switching device 43 is disposed between the positive electrode 22a of the battery pack 22 and the W-phase terminal 14W of the motor 14. The fourth switching device 44 is disposed between a PGND and the U-phase terminal 14U of the motor 14. The fifth switching device 45 is disposed between the PGND and the V-phase terminal 14V of the motor 14. The sixth switching device 46 is disposed between the POND and the W-phase terminal 14W of the motor 14.

A GaN (gallium nitride) semiconductor transistor is adopted in each of the switching devices 41 to 46. Note that other type of III-V semiconductor transistor can be adopted in each of the switching devices 41 to 46. A SiC (silicon carbide) semiconductor transistor may be adopted in each of the switching device 41 to 46. Various types of semiconductor switches can be adopted in the switching devices 41 to 46 with no particular limitation.

The PGND of the motor drive circuit 40 is connected to a negative electrode 22b of the battery pack 22 via a cut-off switch 48 and a shunt resistor 50. The cut-off switch 48 is an n-channel field effect transistor (FET). The cut-off switch 48 is connected to the controller 70 and controlled by the controller 70. For example, when the user turns the trigger switch 16 off, the cut-off switch 48 is turned off. As a result, the motor 14 is electrically cut off from the battery pack 22, regardless of the status of the motor drive circuit 40. According to this circuit configuration, because the trigger switch 16 can be separated from the motor power supply path, losses due to node resistance of the trigger switch 16 can be eliminated. In addition, when the cut-off switch 48 is turned off, the controller 70 of the present embodiment turns the first to third switching devices 41 to 43 on and puts a brake on the motor 14 by shorting a coil of the motor 14.

In the present embodiment, a drain terminal 48a of the cut-off switch 48 is connected to a 5-volt voltage terminal via a resistance element 52 in order to diagnose a failure in the cut-off switch 48. The resistance element 52, referred to as "pull-up resister", applies a constant voltage of 5 volts to a node of the cut-off switch 48 and the motor drive circuit 40. Furthermore, the voltage of the node (i.e., the voltage of the drain terminal 48a) is monitored by the controller 70. The controller 70 can determine whether the cut-off switch 48 is normal or abnormal, by turning the cut-off switch 48 on/off and detecting the voltage of the drain terminal 48a.

The shunt resistor 50 generates a voltage in accordance with a current flowing through the motor 14. The voltage generated in the shunt resistor 50 is detected by a current detect circuit 54. The current detect circuit 54 detects the current flowing through the motor 14, based on the voltage generated in the shunt resistor 50. A detection value of the current obtained by the current detect circuit 54 is input to the controller 70. Note that a voltage is generated between the drain and the source of the cut-off switch 48 as well in accordance with the current flowing through the motor 14. Therefore, the current detect circuit 54 may detect the voltage generated between the drain and the source of the cut-off switch 48, in addition to the voltage generated in the shunt resistor 50.

The circular saw 10 has a rotor position detect circuit 56 and a rotor speed calculation circuit 58. The rotor position detect circuit 56 is connected to the position sensor 15 of the motor 14 and detects a rotational position of the rotor of the motor 14 on the basis of an output signal from the positional sensor 15. A detection value obtained by the rotor position detect circuit 56 is input to the rotor speed calculation circuit 58 and the controller 70. The rotor speed calculation circuit 58 calculates a rotational speed of the rotor of the motor 14 on the basis of the detection value obtained by the rotor position detect circuit 56. Thus obtained calculated value of the rotor speed calculation circuit 58 is input to the controller 70.

The controller 70 has a gate driver 72, a PWM (pulse-width modulation) signal generator 74, and an over-current detector 76. The gate driver 72 is connected to each of the switching devices 41 to 46. The gate driver 72 selectively outputs an on-signal to each of the switching devices 41 to 46 in response to the rotational position of the rotor detected by the rotor position detect circuit 56. The PWM signal generator 74 generates a PWM signal in accordance with an operation valuable applied to the trigger switch 16 by the user. The PWM signal generator 74 increase a duty ratio of the PWM signal as the operation valuable applied to the trigger switch 16 increases. The gate driver 72 controls PWM of the switching devices 41 to 46 in response to the PWM signal obtained from the PWM signal generator 74. In so doing, the gate driver 72 preferably performs complementary PWM control. As a result, losses due to PWM control can be reduced.

The over-current detector 76 stores a first limit value and a second limit value in relation to the current of the motor 14. In the present embodiment, the first limit value is set at 50 amperes, and the second limit value at 60 amperes. Note that the first limit value and the second limit value are not limited to these values. The over-current detector 76 detects an over-current flowing through the motor 14, in two stages, by comparing the detected current value of the motor 14 with the first limit value and the second limit value. Thus obtained result of the detection by the over-current detector 76 is input to the gate driver 72.

Figure 3:
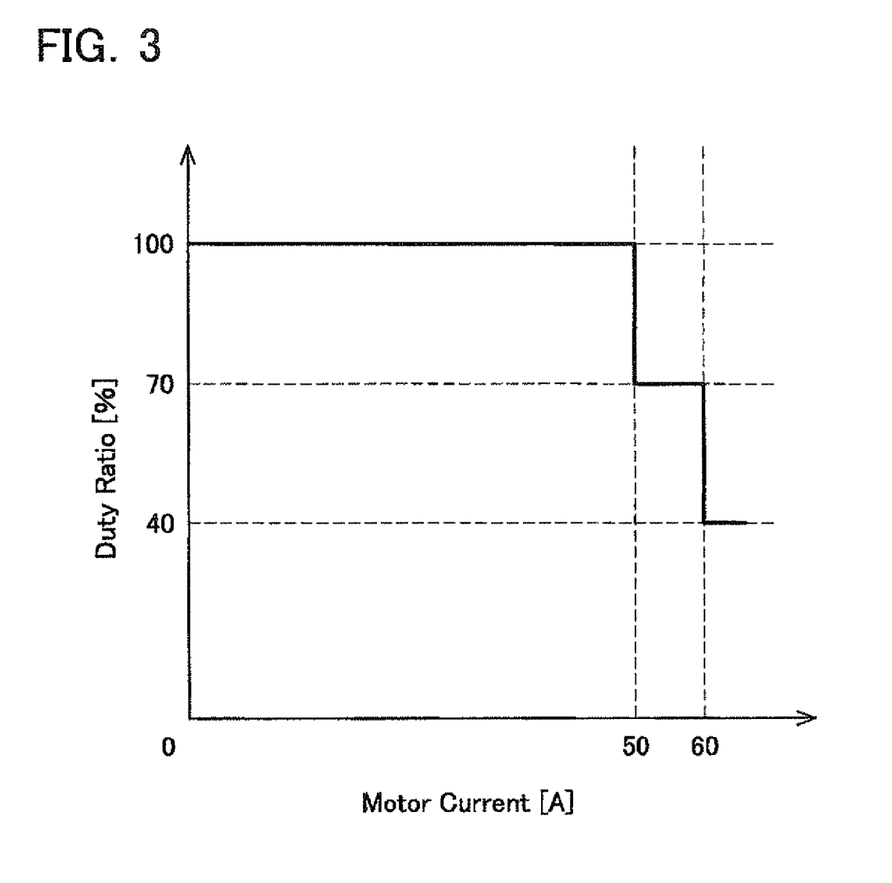
FIG. 3 is a graph showing a limit value of a duty ratio to a motor current.

The gate driver 72 limits the maximum duty ratio of the motor 14 in response to the result of the detection obtained by the over-current detector 76. As shown in FIG. 3, when the current value of the motor 14 exceeds the first limit value (50 amperes), the maximum duty ratio of the motor 14 is limited to 70 percent. When the current value of the motor 14 exceeds the second limit value (60 amperes), the maximum duty ratio of the motor 14 is limited to 40 percent. Limiting the duty ratio of the motor 14 results in a significant reduction of the output of the circular saw 10. The decrease in the output of the circular saw 10 causes the user to naturally drop the load applied to the circular saw 10. As a result, the user can use the circular saw 10 while applying an appropriate load thereto. Then, the motor 14 is prevented from being locked, preventing the motor coil from burning out. Note that when the current value of the motor 14 exceeds the second limit value (60 amperes), the duty ratio of the motor 14 may be limited so as to keep the current value of the motor 14 at a constant level (60 amperes or lower).

Figure 4:
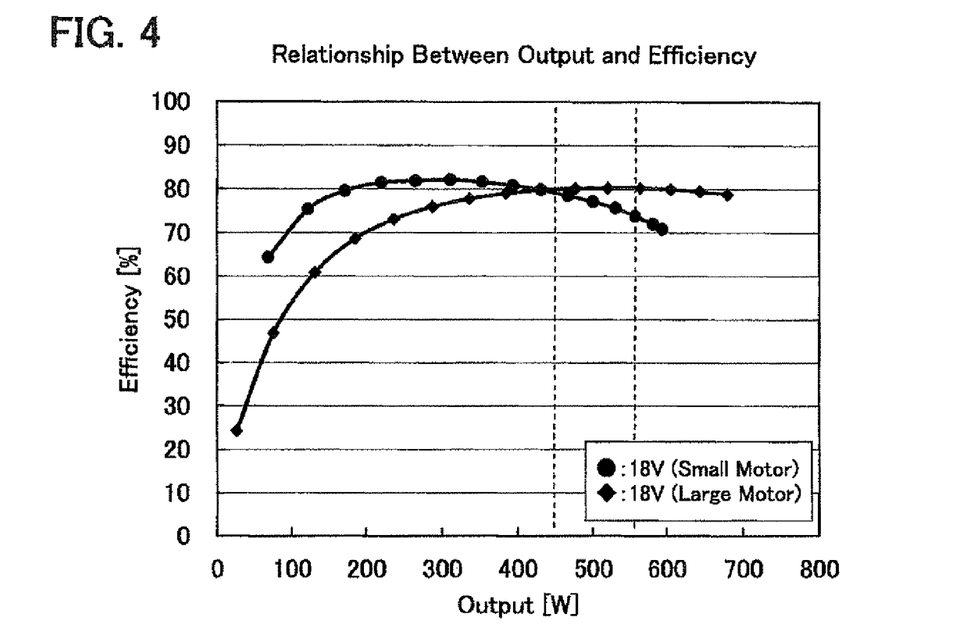
FIG. 4 is a graph showing a relationship between an output and efficiency of the circular saw according to the embodiment.
Figure 5:
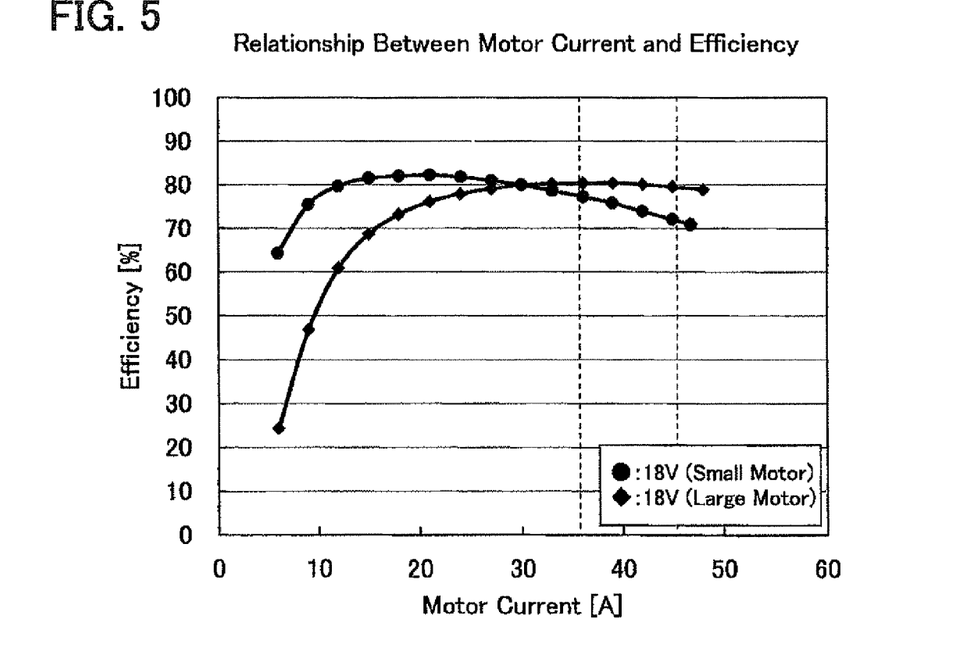
FIG. 5 is a graph showing a relationship between the motor current and efficiency of the circular saw according to the embodiment.

The circular saw 10 of the present embodiment is characterized in having a high overall electric efficiency. The circular saw 10 is particularly so designed that the overall electric efficiency thereof becomes high when the circular saw 10 is operated to output high power where the current value of the motor 14 is high. Specifically, as shown in FIG. 4, the circular saw 10 is characterized in that the overall electric efficiency thereof becomes at least 70 percent at all times when the circular saw 10 outputs power of at least 450 watts but no more than 550 watts. Furthermore, as shown in FIG. 5, the overall electric efficiency is at least 70 percent at all times when a current of at least 35 amperes but no more than 45 amperes flows through the motor 14. Note that, in FIGS. 4 and 5, data shown by the circular plots (•) are obtained when the motor 14 of a small type is adopted, and data shown by square plots (♦) are obtained when the motor 14 of a large type is adopted.

Here, the overall electric efficiency means a percentage of the power that is actually output from the motor 14, relative to electric power supplied by the battery pack 22. The power that is actually output by the motor 14 is partially mechanically lost in a decelerator and the like, and the rest of the power becomes an actual output provided by the tool (the circular saw 10) to the work piece. Therefore, even when the capacity of the battery pack 22 does not change, the actual output of the tool (the circular saw 10) can be increased by improving the overall electric efficiency thereof.

Figure 6:
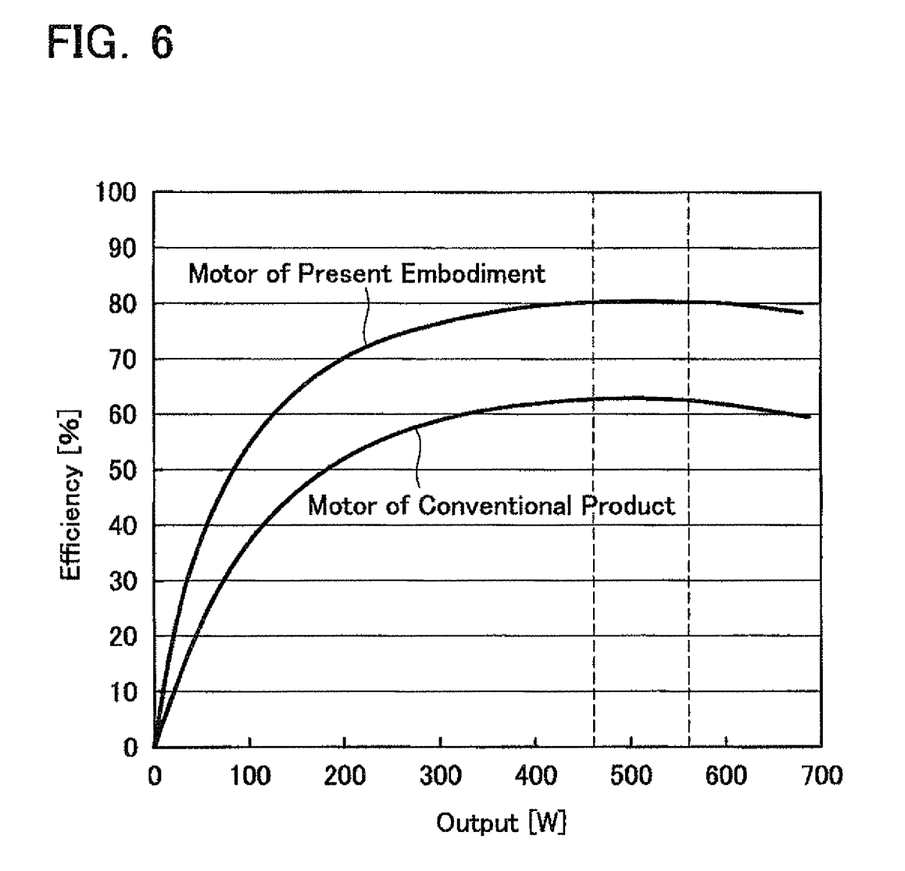
FIG. 6 is a graph showing a relationship between an output and efficiency of a motor according to the embodiment.

Electrical loss generated in the area between the battery pack 22 and the motor 14 (including the motor 14) needs to be reduced in order to improve the overall electric efficiency. More specifically, first, the winding resistance of the motor 14 may be reduced to prevent the occurrence of loss in the motor 14 (i.e., to improve the motor efficiency). In the present embodiment, the cross-sectional area of a winding strand of the winding of the motor 14 is increased and the number of windings is reduced, in order to reduce the winding resistance of the motor 14. As a result, the efficiency reaches approximately 80 percent within a range of output of the motor 14 between 450 watts and 550 watts, as shown in FIG. 6. This means that the occurrence of loss caused by the winding resistance of the motor 14 is significantly prevented within the same output range, compared to a conventional motor in which the efficiency remains at approximately 62 percent.

Moreover, reducing power supply resistance of the motor drive circuit (motor controller) 40 or, in other words, reducing the on-resistance of the first to sixth switching devices 41 to 46 is also effective in improving the overall electric efficiency. For this reason, it is preferred that a semiconductor transistor with small on-resistance be adopted as each of the first to sixth switching devices 41 to 46, and it is effective to adopt the III-V semiconductor transistor or the SIC semiconductor as in the present embodiment. In this case, the on-resistance of the semiconductor transistor is preferably 3 milliohm or lower.

In addition, in order to improve the overall electric efficiency, it is effective to eliminate node resistance of the trigger switch 16 and the other operation switches from the motor power supply path by separating the operation switches from the motor power supply path. In this case, it is preferred that the cut-off switch 48 including the semiconductor switch be disposed in the motor power supply path, as described above. Furthermore, reducing contact resistance of a harness connector such as a solderless terminal, a receptacle, etc. is also effective in improving the overall electric efficiency.

Figure 7:
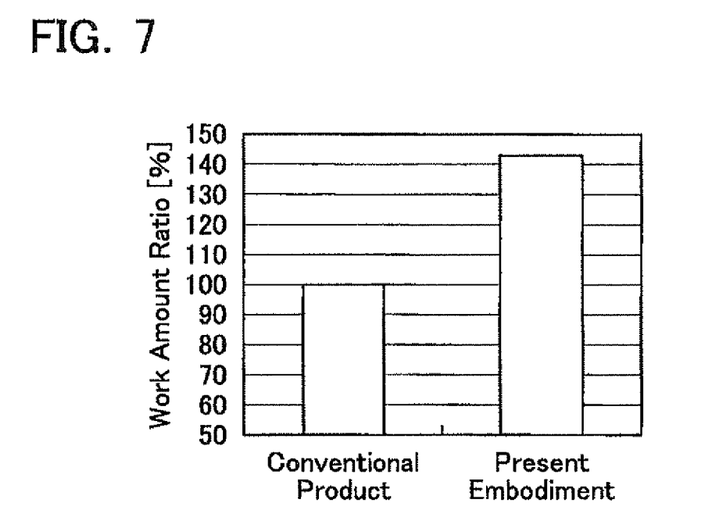
FIG. 7 is a graph showing a ratio between a work amount of the circular saw according to the embodiment and a work amount of a conventional circular saw.

By improving the overall electric efficiency described above, the overall electric efficiency can be kept at 70 percent or above at all times when the circular saw 10 of the present embodiment outputs power of at least 450 watts but no more than 550 watts. As a result, as shown in FIG. 7, the work amount of the circular saw 10 is improved by approximately 40 percent, compared to a conventional circular saw. The work amount here means the amount of work that can be performed per charging operation of the battery pack 22. In other words, the circular saw 10 of the present embodiment can perform approximately 1.4 times more work than the conventional circular saw by solely using the fully-charged battery pack 22.

Figure 8:
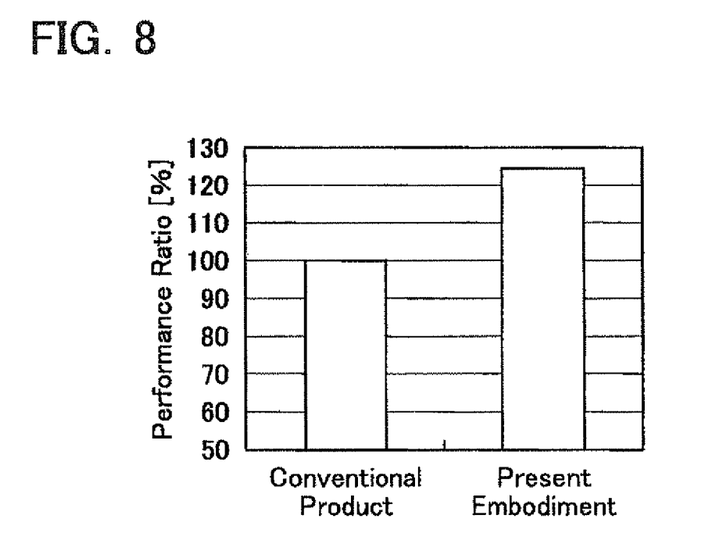
FIG. 8 is a graph showing a ratio between performance of the circular saw according to the embodiment and performance of the conventional circular saw.

In addition, as shown in FIG. 8, the operating efficiency of the circular saw 10 of the present embodiment is improved by approximately 20 percent, compared to the conventional circular saw. The operating efficiency here means the amount of work performed per unit time and is equivalent to an output obtained when the circular saw 10 is actually used. It is considered that the work efficiency is improved because the amount of current flowing through the battery pack 22 drops in relation to the output of the motor and the losses that occur in the battery pack 22 are reduced as a result of improving the overall electric efficiency. The actual output of the circular saw 10 can be improved in this manner by improving the overall electric efficiency thereof without increasing the output of the battery pack 22.

The overall electric efficiency of the electric power tool can be obtained as follows. As described above, the overall electric efficiency is a percentage of power that is actually output by the motor 14, relative to the electric power supplied by the battery pack 22. The electric power supplied by the battery pack 22 can be obtained by measuring the voltage and the current of the battery pack 22. Furthermore, the actual output of the motor 14 can be obtained by measuring an output torque and rotational speed of the motor 14. In other words, the overall electric efficiency $\eta$ is expressed as: $\eta=(T\times\omega)/(V\times I)$, where V represents the voltage of the battery pack 22, I represents the current of the battery pack 22, T represents the output torque of the motor 14, and $\omega$ represents the rotational speed of the motor 14.

When it is difficult to measure each of the notations described above, the overall electric efficiency $\eta$ can be estimated using a current Io of the battery pack 22 obtained when the tool is operated in an unloaded state (i.e., an idling state) without the decelerator, and a current Is of the battery pack 22 obtained when the tool is locked. The current Is may be actually measured when the tool is locked, but can also be obtained using an equation, $Is=Vo/(Rc+Rm)$, where Vo represents an open voltage of the battery pack 22, Rc represents controller resistance between the output of the battery pack 22 and the motor 14 through the motor drive circuit (motor controller) 40, and Rm represents line resistance of the motor 14. The overall electric efficiency $\eta$ can be obtained by an equation: $\eta=(1-Io/I)\times(1-I/Is)$, where I represents a current of the battery pack 22.

What is claimed is:

1. A cordless electric power tool comprising:
   a three-phase brushless motor that drives a tool, the motor including a U-phase terminal, a V-phase terminal, and a W-phase terminal;
   a battery that supplies electric power to the motor;
   a motor drive circuit that includes a first switching device, a second switching device, and a third switching device, the U-phase terminal of the motor being electrically connected with the battery via the first switching device, the V-phase terminal of the motor being electrically connected with the battery via the second switching device, the W-phase terminal of the motor being electrically connected with the battery via the third switching device, and the first switching device, the second switching device, and the third switching device being connected in parallel with each other;
   a cut-off switch that includes a semiconductor switch disposed between the battery and the motor drive circuit, the semiconductor switch being electrically connected in series with each of the first switching device, the second switching device, and the third switching device; and
   a pull-up resister that is electrically connected to a node between the cut-off switch and the motor drive circuit and is configured to apply a predetermined voltage to the node, wherein
   the battery has a nominal voltage that is no more than 24 volts, and
   an overall electric efficiency of the cordless electric power tool becomes at least 70 percent when the cordless electric power tool outputs power of at least 450 watts but no more than 550 watts.

2. The cordless electric power tool as in claim 1, wherein the nominal voltage of the battery is at least 18 volts but no more than 24 volts.

3. The cordless electric power tool as in claim 1, wherein the nominal voltage of the battery is equal to 18 volts.

4. The cordless electric power tool as in claim 1, wherein each of the first switching device, the second switching device, and the third switching device of the motor drive circuit is a III-V semiconductor transistor.

5. The cordless electric power tool as in claim 1, wherein the semiconductor switch of the cut-off switch is a III-V semiconductor transistor.

6. A cordless electric power tool comprising:
   a three-phase brushless motor that drives a tool, the motor including a U-phase terminal, a V-phase terminal, and a W-phase terminal;
   a battery that supplies electric power to the motor;
   a motor drive circuit that includes a first switching device, a second switching device, and a third switching device, the U-phase terminal of the motor being electrically connected with the battery via the first switching device, the V-phase terminal of the motor being electrically connected with the battery via the second switching device, the W-phase terminal of the motor being electrically connected with the battery via the third switching device, and the first switching device, the second switching device, and the third switching device being connected in parallel with each other;

a cut-off switch that includes a semiconductor switch disposed between the battery and the motor drive circuit, the semiconductor switch being electrically connected in series with each of the first switching device, the second switching device, and the third switching device; and a pull-up resister that is electrically connected to a node between the cut-off switch and the motor drive circuit and is configured to apply a predetermined voltage to the node, wherein the battery has a nominal voltage that is at least 14.4 volts, and an overall electric efficiency of the cordless electric power tool becomes at least 70 percent when a value of current passing through the motor becomes at least 35 amperes but no more than 45 amperes.

7. The cordless electric power tool as in claim 6, wherein the nominal voltage of the battery is at least 14.4 volts but no more than 18 volts.

8. The cordless electric power tool as in claim 6, wherein the nominal voltage of the battery equal to 18 volts.

9. The cordless electric power tool as in claim 6, wherein each of the first switching device, the second switching device, and the third switching device of the motor drive circuit is a III-V semiconductor transistor.

10. The cordless electric power tool as in claim 6, wherein the semiconductor device of the cut-off switch is a III-V semiconductor transistor.

* * * * *